United States Patent
Hocken et al.

(10) Patent No.: US 6,534,990 B2
(45) Date of Patent: Mar. 18, 2003

(54) VOLTAGE REGULATOR WAKE UP CONTROL USING FREQUENCY DETECTION

(75) Inventors: Lary Robert Hocken, Davison, MI (US); Benjamin T Purman, Ann Arbor, MI (US); Stephen Wayne Anderson, Anderson, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/908,478

(22) Filed: Jul. 18, 2001

(65) Prior Publication Data

US 2003/0016021 A1 Jan. 23, 2003

(51) Int. Cl.⁷ .................... G01R 31/40; G01R 23/165; G06F 1/32; H02H 7/00
(52) U.S. Cl. .................... 324/416; 324/76.46; 713/320; 713/323; 361/18; 361/20
(58) Field of Search .................... 324/416, 76.29, 324/76.46; 322/28, 22; 323/285, 284, 286, 282; 361/18, 20, 21; 713/300, 320, 323

(56) References Cited

U.S. PATENT DOCUMENTS

| | | | | |
|---|---|---|---|---|
| 3,986,100 A | * | 10/1976 | Beierholm et al. | 323/285 |
| 4,222,005 A | * | 9/1980 | Naito | 324/416 |
| 4,777,425 A | * | 10/1988 | MacFarlane | 322/25 |
| 5,225,764 A | * | 7/1993 | Falater | 322/22 |
| 5,907,233 A | * | 5/1999 | Jabaji | 322/28 |
| 6,316,919 B1 | * | 11/2001 | Sumimoto et al. | 322/28 |

\* cited by examiner

*Primary Examiner*—Christine Oda
*Assistant Examiner*—Anjan K. Deb
(74) *Attorney, Agent, or Firm*—Margaret A. Dobrowitsky

(57) ABSTRACT

A generator wake-up system that transitions the voltage regulator from a low power, sleep mode to full voltage regulation mode when the wake-up system detects and confirms a valid frequency of rotation of the generator. The wake-up system includes a control circuit to filter, amplify, and detect the proper threshold of an input waveform; and an assessing device that implements a control algorithm to measure and validate the input waveform.

8 Claims, 3 Drawing Sheets

VOLTAGE REGULATOR WAKE UP CONTROL USING FREQUENCY DETECTION

TECHNICAL FIELD

This invention relates to vehicle electrical generators and more particularly to an alternator including a voltage regulator that, without a separate control wire from the ignition, becomes fully operational after the engine is started.

BACKGROUND OF THE INVENTION

Conventional vehicle electrical generators include a voltage regulator that controls the output voltage of the generator to a calibrated voltage setpoint. When the engine is not running, the regulator goes into a low power, sleep mode of reduced current consumption, thereby preventing battery discharge. A conventional method of controlling the sleep mode is by utilizing the ignition on/off switch, indicating a desire to initiate or terminate voltage regulation.

Another method of controlling the sleep mode is a vehicle start feature that eliminates the need for a separate control wire from the vehicle's ignition to control sleep mode. This feature wakes up the regulator only when the engine is started which it detects by means of alternator rotation. When the engine is started, it causes the generator rotor to rotate by means of a belt/pulley system. The rotating generator creates a voltage due to residual magnetism in the rotor. The detected voltage creates a signal to wake up the voltage regulator which transitions the microcontroller from a low power mode to a full operational mode.

However this method of controlling the regulator sleep mode is susceptible to DC voltage offsets, due to rectifier bridge leakage, and high frequency noise such as RF energy, that may inadvertently trigger the wake up signal. Also, the residual magnetism of a single phase is a sinusoidal waveform with amplitudes typically less than 0.2 volts peak-to-peak. The low amplitude makes it difficult to determine if actual wake up should occur, especially considering all the electrical noise present in current automotive applications. As such, this feature is used only as a backup feature triggering at higher generator rotation speeds to wake up the voltage regulator if the input from the ignition is not working properly. It is contemplated that the automatic start feature could be expanded to include the analysis of two of the three generator phases and comparing the difference between the two to determine a trigger threshold. Then two sinusoidal waveforms are 120 degrees out of phase, and generate a voltage that is 70% higher in amplitude. Although more dependable, this is not a cost-effective design.

SUMMARY OF THE INVENTION

The present invention provides a system to transition or wake up, a voltage regulator in an automotive electrical generator from a low power, sleep mode to a full voltage regulation mode in response to starting the engine without requiring input from the vehicle ignition. Wake-up occurs when the voltage regulator detects and confirms a valid frequency of rotation of the generator.

More specifically, the invention provides a control circuit configuration comprising a first filter means for eliminating high frequency noise in the voltage signal created in response to generator rotation providing a filtered signal; an amplifier means for modifying the amplitude of the filtered signal; a second filter means for eliminating the susceptibility of the signal to DC offset voltages; a detection circuit means for establishing a triggering threshold from the signal and defining an input waveform; and a microcontroller means for assessing the input waveform and controlling voltage regulator transition from low power mode to full voltage mode.

The microcontroller performs the control steps of:

initialization in response to a valid input signal;

checking the phase frequency input to determine if a valid input frequency is detected;

energizing the field coil in a fixed duty cycle if a valid frequency is detected;

changing the phase voltage gain circuit to a gain reduction that is lower than the wake-up gain;

waiting for the field coil and phase coils to energize a field strobe condition and checking the phase frequency again for a valid frequency;

transitioning to full voltage regulation upon verification of a valid frequency; and transitioning to a low power mode upon determination that the frequency is invalid.

These and other features and advantages of the invention will be more fully understood from the following description of certain specific embodiments of the invention taken together with the accompanying drawings.

DESCRIPTION OF THE PREFERRED EMBODIMENT

Figure 1:
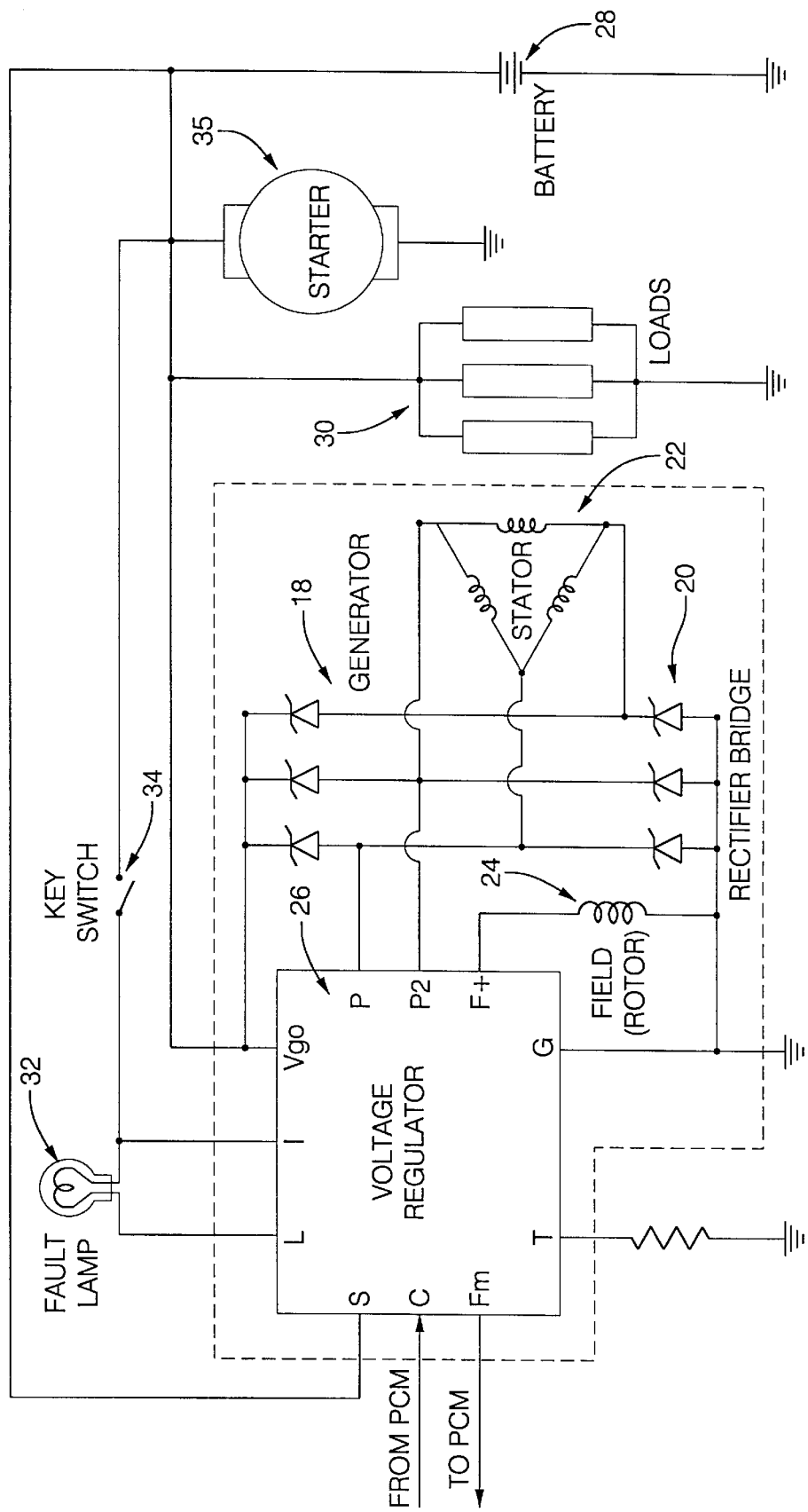
FIG. 1 is an environmental plan view illustrating a vehicle electrical current generating system.

Referring now to the drawings in detail, there is illustrated in FIG. 1 a general vehicle generator diagram including a generator 18, a rectifier bridge 20, three phase stator 22, rotating magnetic field coil, or rotor 24, and voltage regulator, 26. Also illustrated are battery 28, loads 30, fault lamp 32, key switch, 34, and starter 35. Power is generated when the magnetic field 24 is rotated inside the three phase stator 22 creating three phase AC power. The AC power is rectified at rectifier bridge 20 to provide DC current. Rotational speed of the magnetic field 24 is controlled by the engine speed and the magnetic intensity is controlled by how much voltage is applied to the field through the regulator 26. Regulator 26 uses the voltage applied to its sense (S) terminal to control how much field voltage to apply. As is more fully described below, regulator 26 includes a control circuit configuration 36, illustrated and described with respect to FIGS. 2–4, to tell the regulator when to transition from a low power, sleep mode to a full voltage regulation mode in response to generator magnetic field rotation when the engine is started. The circuit 36 is more robust to DC leakage currents and high frequency noise that may inadvertently wake up the voltage regulator.

Figure 2:
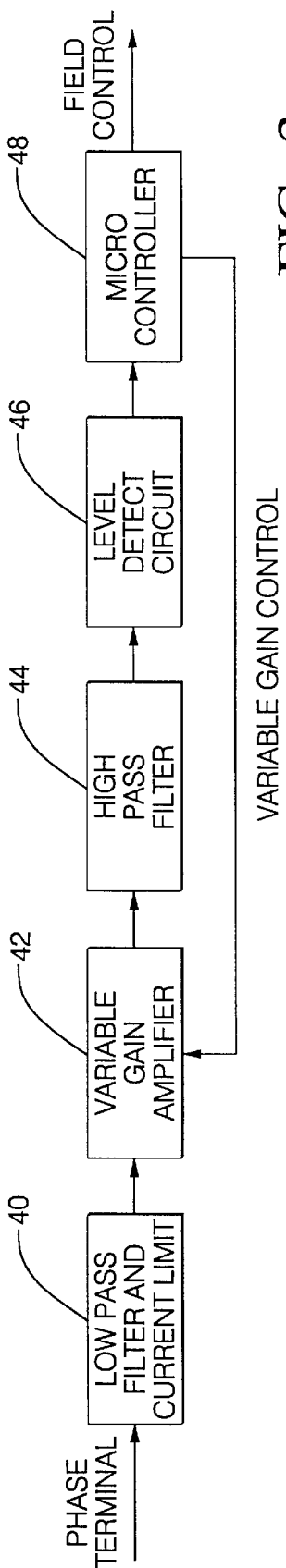
FIG. 2 is a functional block diagram of a control circuit configuration for switching the voltage regulator from a low power mode to a full voltage regulation mode constructed in accordance with the present invention.

FIG. 2 illustrates the functional aspects of the control circuit configuration 36 in regulator 26. When the engine is started, it causes the generator rotor 24 to rotate through the engine's belt pulley system. The rotating magnetic field 24 creates a voltage which is processed to determine whether the regulator 26 should transition from its low power mode to full operational mode.

With continuing references to FIG. 2, the generated voltage is filtered, block 40, by a low pass filter to eliminate high frequency noise which might otherwise inadvertently trigger detection of a valid signal which would wake up the regulator 26 from a low power mode. The filtered signal, is amplified, block 42, through a variable gain amplifier to amplify or reduce the amplitude of the incoming waveform. Next the signal is filtered, block 44, through a high pass filter to eliminate the susceptibility to DC offset voltages. A detection circuit, block 46, establishes the triggering threshold of the input waveform. Then an assessing device such as a microcontroller with associated software, block 48, determines if the input signal is a valid frequency, and if the controller should allow the voltage regulator 26 to energize the field coil 24. After the field coil 24 is energized, the microcontroller changes the gain of the variable gain amplifier, 42, continuing to verify that the phase input is still a valid frequency.

Figure 3:
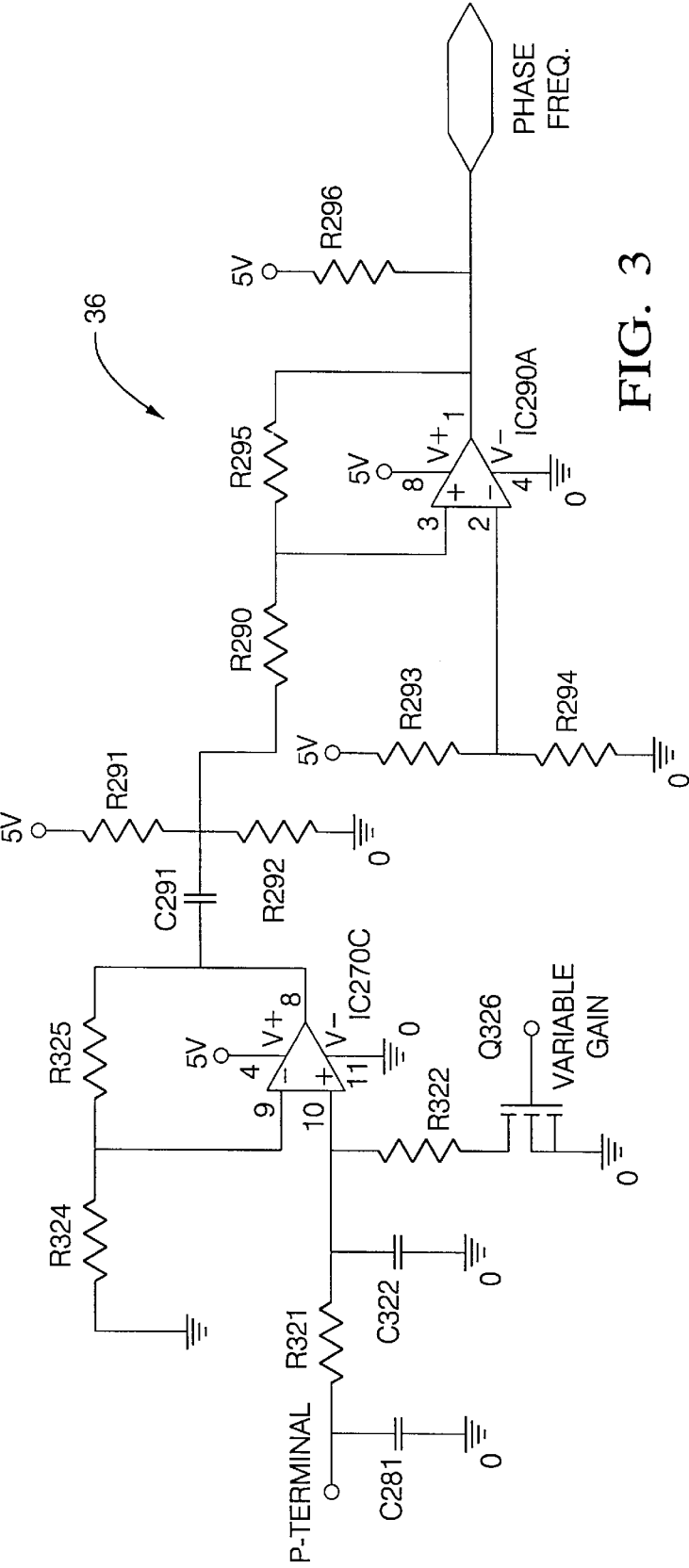
FIG. 3 is a circuit diagram illustrating the control circuit configuration of the present invention.

Referring to the circuit diagram of FIG. 3, which illustrates the control circuit configuration 36 for switching voltage regulator 26. R321 and C322 comprise a low pass filter that reduces the effects of high frequency noise which may cause undesired false "wake up" signals that transition the regulator from its low power, sleep mode to fully operational mode. Circuit 36 is designed to reduce the effects of frequencies above 5 kHz. R321 also serves to limit the input current into IC270. This current limit will prevent disruption of the op-amp output when the input voltage exceeds the op-amp supply voltage. C281 is a capacitor that shunts high frequency energy to ground to prevent inadvertent "wake up's".

IC270 is configured as a voltage amplifier. Turning Q326 "off", and selecting R324 and R325 as the same value, sets the op-amp gain to 2.0. The gain is determined by the equation: gain=(R324+R325)/R324. When Q326 is on, R322 is added in, creating a voltage divider with R321. The gain is determined by the equation: gain=((R324+R325)/(R321+R322)*(R322/R324). By dividing the voltage down, the circuit is less susceptible to noise. The algorithm can then energize the field coil 24 on the generator, and watch the phase input for a valid frequency. If the frequency is still valid after reducing the gain, then the generator is truly turning, and a real transition from low power, sleep mode to full operational mode was requested. When Q326 is turned on, R322 is added into the circuit, changing the cutoff frequency of the low pass filter.

C291, R291, and R292 make up a high pass filter. This circuit reduces the susceptibility of the circuit to DC voltage offsets (caused by rectifier leakage). This reduces the potential for regulator 26 to have inadvertent wake-ups. C291 is selected to filter out frequencies below 10 Hz. R291 and R292 form a voltage divider to set up the DC offset voltage for the sinusoidal output voltage waveform.

IC290, R290, R293, R294, R295, and R296 make up a voltage threshold detection circuit. R293 and R294 establish a voltage threshold that is sufficiently low to detect the peak voltage of a sinusoidal waveform that is generated by residual magnetism (approximately 0.18 volts peak Phase voltage). R290 limits the current into IC290. R295 adds hysteresis into the circuit to increase noise immunity at the output of IC290. The slow changing sinusoidal waveform on the input makes this circuit more susceptible to multiple transitions. R296 provides the pull-up voltage for the output of IC290 (an open drain output).

Figure 4:
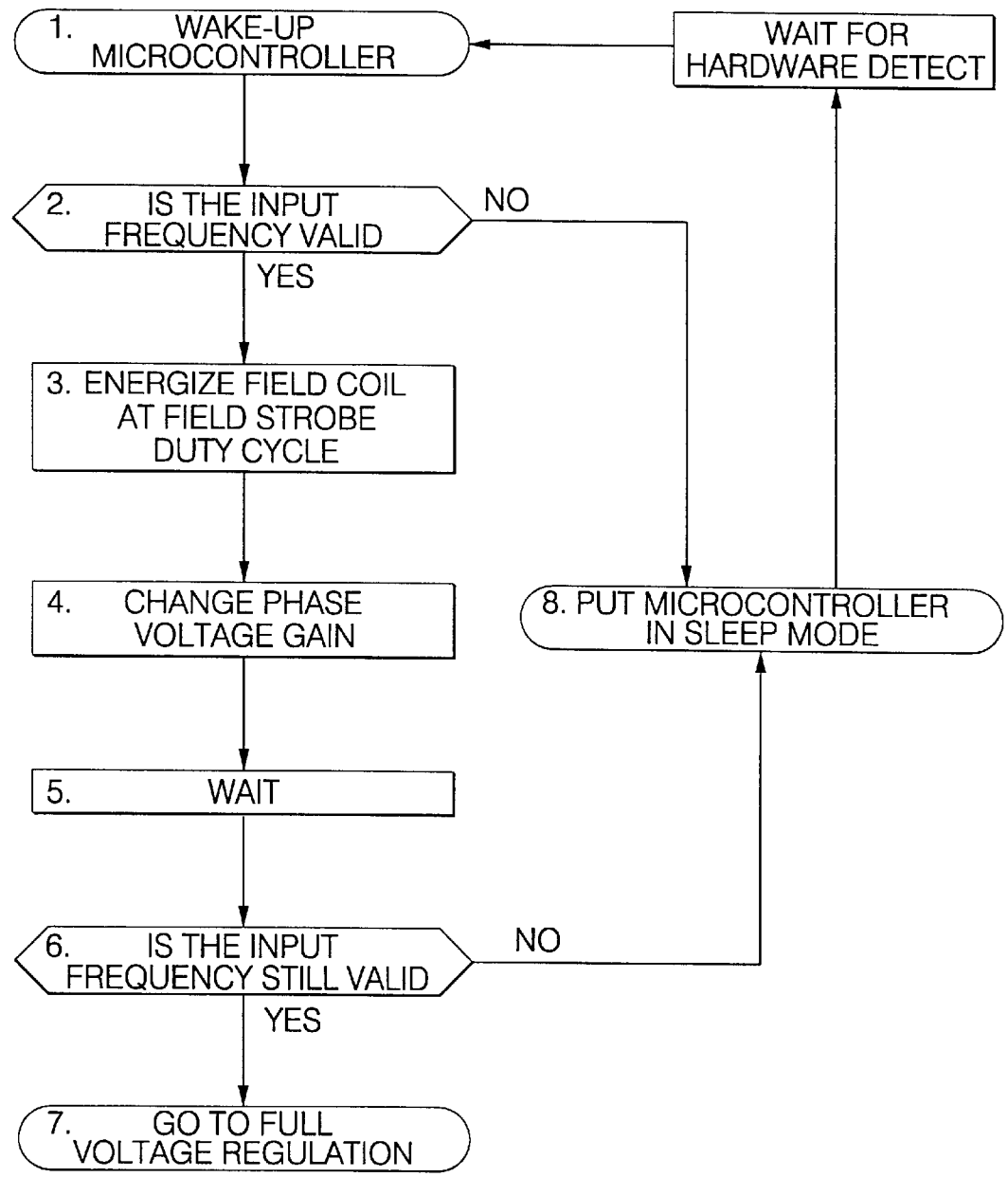
FIG. 4 is a flow chart illustrating the control steps of the microprocessor.

FIG. 4 illustrates the control steps of a microcontroller, or input detection circuitry and software required to perform the diagnostics on the input waveform. This detection circuitry need not be limited to a microcontroller but may include a discrete component or custom integrated circuit designed to perform the same function. As is herein described, when the microcontroller receives a valid "wake-up" pulse, the microcontroller hardware transitions the regulator 26 from a low-power mode to a normal operating mode. At that instant software execution is started. After proper initialization (step 1) of the microcontroller after the "wake-up" signal, the software algorithm checks the phase frequency input to determine if a valid input frequency (step 2) is detected. A software algorithm to filter the phase frequency input may be used to ensure the incoming signal is valid.

If a valid frequency is detected, the field coil 24 is energized in a fixed duty cycle mode (step 3—'Field Strobe'). The Phase Voltage gain circuit is then changed to a gain reduction (~0.4) that is lower than the "wake-up" gain (step 4). After waiting (step 5) some time for the field coil and phase coils to energize the 'Field Strobe' condition, the phase frequency is checked again (step 6) for a valid frequency. If the rotor 24 is turning properly, the phase coils will be generating a sinusoidal voltage output, and valid input or signal start has occurred. The control algorithm then transitions the voltage regulator 26 to full voltage regulation (step 7).

If during the frequency verification test, the frequency is determined to be invalid, i.e. the start signal was activated inadvertently, the microcontroller should flag a false "start", and cause the voltage regulator 26 to go back to low power mode (step 8). The determination of a valid frequency may include single or multiple checks of the input prior to determining whether the "start" was inadvertent.

In an alternative embodiment, a variable detection threshold shift at the input to IC290 could be added to obtain more noise immunity. This could be accomplished by adding a resistor in parallel with R294. This resistor would be switched on and off by a transistor that is controlled by the variable gain signal. This circuit would be the same configuration as R322 and Q326.

The dual phase regulator start feature may be added back in if needed. A series resistor can be added between the Phase 2 input from the alternator and the V-input of IC270. The voltage detected would then be the voltage difference between the P and P2 terminals. The input resistance for the P2-terminal must match the P-terminal resistance. A low-pass filter capacitor (the same value as C322) would also be required on the V-input of IC270. A bypass capacitor may be needed on the Phase 2 input pin to prevent electromagnetic energy from causing inadvertent wake-ups.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A control circuit configuration for waking up a voltage regulator in a vehicle electrical generator from a sleep mode to a normal operating mode in response to generator magnetic field rotation wherein a single phase of a three phase generator creates a voltage due to residual magnetism in the rotor, the control circuit configuration comprising:

first filter means for eliminating high frequency noise in the voltage signal created in response to generator rotation providing a filtered signal;

amplifier means for modifying the amplitude of the filtered signal;

second filter means for eliminating the susceptibility of the signal to DC offset voltages;

detection circuit means for establishing a triggering threshold for the twice filtered, amplified input voltage and determining an input waveform; and assessing means for assessing the input waveform and controlling voltage regulator transition from the sleep mode to the normal operating mode.

2. The control circuit configuration of claim 1 wherein said first filter means is a low-pass filter.

3. The control circuit configuration of claim 1 wherein said amplifier means is a variable gain amplifier.

4. The control circuit configuration of claim 1 wherein said second filter means is a high pass filter.

5. The control circuit configuration of claim 1 wherein said detection circuit means is a level detect circuit for detecting a low sinusoidal peak voltage.

6. The control circuit configuration of claim 1 wherein said assessing means is a microcontroller.

7. The control circuit configuration of claim 6 wherein said microcontroller performs in any order the control steps of:

initialization in response to a valid input signal;

checking the phase frequency input to determine if a valid input frequency is detected;

energizing the field coil in a fixed duty cycle if a valid frequency is detected;

changing the phase voltage gain circuit to a gain reduction that is lower than the wake-up gain;

waiting for the field coil and phase coils to energize a field strobe condition and checking the phase frequency again for a valid frequency;

transitioning to normal operation regulation upon verification of a valid frequency; and transitioning to the sleep mode upon determination that the frequency is invalid.

8. A control circuit configuration for switching a voltage regulator in a vehicle electrical generator from a sleep mode to a normal operation mode in response to generator magnetic field rotation wherein two phases of the three phase generator create a differential voltage due to residual magnetism in the rotor, the control circuit configuration comprising:

first filter means for eliminating high frequency noise in the differential voltage signal created in response to generator rotation providing a filtered signal;

amplifier means for modifying the amplitude of the filtered signal;

second filter means for eliminating the susceptibility of the signal to DC offset voltages;

detection circuit means for establishing a triggering threshold for the twice filtered, amplified differential voltage and determining an input waveform; and assessing means for assessing the input waveform and controlling voltage regulator transition from the sleep mode to a normal operating mode.

* * * * *